(12) United States Patent
Azamfar

(10) Patent No.: US 10,269,264 B2
(45) Date of Patent: Apr. 23, 2019

(54) DEVICE AND METHODS FOR CONTINUOSLY REFRESHING A TACTILE DISPLAY

(71) Applicant: Moslem Azamfar, Semirom (IR)

(72) Inventor: Moslem Azamfar, Semirom (IR)

( * ) Notice: Subject to any disclaimer, the term of this patent is extended or adjusted under 35 U.S.C. 154(b) by 284 days.

(21) Appl. No.: 15/371,095

(22) Filed: Dec. 6, 2016

(65) Prior Publication Data

US 2017/0287359 A1  Oct. 5, 2017

(30) Foreign Application Priority Data

Apr. 4, 2016 (IR) .................. 139450140003000349

(51) Int. Cl.
*G09B 21/00* (2006.01)

(52) U.S. Cl.
CPC .................................. *G09B 21/004* (2013.01)

(58) Field of Classification Search
CPC ... G09B 21/004; G09B 21/001; G09B 21/003
USPC .................................................. 434/112, 114
See application file for complete search history.

(56) References Cited

U.S. PATENT DOCUMENTS

| | | | | | |
|---|---|---|---|---|---|
| 3,624,772 A | * | 11/1971 | Grunwald | ................... | B41J 3/32 178/17 A |
| 3,736,672 A | * | 6/1973 | Skewis | ................ | G09B 21/001 434/114 |
| 4,500,293 A | * | 2/1985 | Eltgen | ................... | G09B 21/003 340/407.1 |
| 4,551,102 A | * | 11/1985 | Meinzer | ............... | G09B 21/001 273/DIG. 27 |
| 4,571,190 A | * | 2/1986 | Zagler | .................... | G09B 21/02 101/23 |
| 4,650,352 A | * | 3/1987 | Eriksson | .............. | G09B 21/003 400/109.1 |
| 5,195,894 A | * | 3/1993 | le Blanc | ................. | G06F 3/016 434/112 |
| 6,109,922 A | * | 8/2000 | Litschel | ............... | G09B 21/004 340/4.12 |
| 6,165,667 A | * | 12/2000 | Takagi | .................... | G03G 9/097 399/297 |
| 6,776,619 B1 | * | 8/2004 | Roberts | ................ | G09B 21/001 340/4.12 |
| 7,744,372 B1 | * | 6/2010 | Minnich | ................ | G09B 21/02 434/113 |
| 2002/0045151 A1 | * | 4/2002 | Roberts | ................ | G09B 21/001 434/113 |

(Continued)

*Primary Examiner* — Sam Yao
*Assistant Examiner* — Michael Humphrey

(57) ABSTRACT

A tactile display apparatus renders information to a user, and comprises multiple braille cells attached adjacent to each other along a predefined path, a set of pins housed within the braille cells, and a set of pin holders inserted on the braille cells. The braille cells are moved periodically at a predefined speed via a driving assembly. The pins are selectively actuated by actuators, where the linear motion of the braille cells allow the user to contact the pins to read the information represented by the arrangement of the pins. The pin holders are moved along a defined path to contact the pins, and each pin holder comprises a rigid body and multiple elastic rings attached along the rigid body. The number of elastic rings is equal to the number of pins to allow the pin holder to selectively hold or release a pin.

19 Claims, 16 Drawing Sheets

(56) References Cited

U.S. PATENT DOCUMENTS

| | | | |
|---|---|---|---|
| 2003/0107531 A1* | 6/2003 | Becker | G09B 21/003 345/31 |
| 2004/0110562 A1* | 6/2004 | Kajino | G09B 21/004 463/36 |
| 2004/0175677 A1* | 9/2004 | Koch | G09B 21/004 434/113 |
| 2005/0079472 A1* | 4/2005 | Shimamura | G09B 21/003 434/114 |
| 2011/0117525 A1* | 5/2011 | Minnich | G09B 21/003 434/113 |

* cited by examiner

US 10,269,264 B2

DEVICE AND METHODS FOR CONTINUOSLY REFRESHING A TACTILE DISPLAY

BACKGROUND OF THE INVENTION

For many years, the blind and the visually impaired have relied on braille as a major means to read text information. Today there are multiple braille displays allowing vision impaired users to better communicate with their environment. The machines that use computers to convert digital text to braille codes to provide such vision impaired users, the opportunity to use the internet and other electronic devices. The existing braille displays, for example, normally consist of 20-80 characters. Each character will be represented by the position of 6 to 8 pins, where each pin is either elevated or retracted. Therefore, each pin will require an actuator to facilitate their respective movement. Thus, each braille display will require a minimum of 120 actuators, or any another similar type of elevating and retracting mechanisms, which can be costly.

Further, since there are too many number of moving parts, the lifetime of the machine is reduced. Another disadvantage includes costly and time-consuming maintenance. In a case, if one of the components malfunction, the reliability of the braille information itself could be compromised. These conventional braille displays normally use the piezoelectric principle to move the pins in an upward and downward direction. The piezoelectric effect is reliable and energy efficient, but the cost of each piezoelectric crystal is $6 to $10 (Dollars), and therefore the overall final cost incurred is, for example, from about $2,000 to $8,000. Therefore, there is a need for a refreshable braille display system to overcome the above-mentioned issues.

However, most of the proposed methods in the art are complex, costly and space consuming, or bulky. Further, due to the increase in the number of mechanical parts, the probability of failure increases with the implication of increase in the repair and maintenance cost. In the old conventional displays, the braille letters, which consist of a specific number of characters, are juxtaposed, and the visually impaired reader can read the text by touching the characters from left to right. In another group of braille displays that are being developed as prototype, employs continuous refreshing of braille cells for reading texts, for example, U.S. Pat. No. 6,776,619 B1, and U.S. Patent No 0011816 A1.

In these displays, the braille cells are embedded on a wheel, and with their rotation of the wheel, the braille characters are displayed in their specific order. However, in these references and other similar applications, in order to adjust pins of each braille cell, the methods employed are costly, complex with over-utilization of space, and of short life span. Considering the above-mentioned issues, there is a need for a refreshable braille display, or a refreshable tactile display apparatus that is low cost, lightweight, and more reliable.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The tactile display apparatus disclosed here addresses the above-mentioned drawbacks and provides necessary solutions. The tactile display apparatus is configured to render information to a user, and comprises multiple braille cells attached adjacent to each other along a predefined path, a set of pins housed within first slots positioned on upper surface of each of the braille cells, and a set of pin holders inserted along second slots positioned on the braille cells. The braille cells are configured to be moved periodically at a predefined speed via a driving assembly. The pins are configured to be selectively actuated by one or more actuators in contact with each of the pins, where the motion of the braille cells, such as, a linear or a rotary motion, allow the user to contact the pins via cutaneous senses of the user's fingers to read the information represented by the arrangement of the pins. Thus, the braille cells are continuously refreshed by the selective actuation of the actuators to move the pins.

The pin holders are configured to be moved along a defined path to contact the pins in a substantially perpendicular direction, and each pin holder comprises a rigid body and multiple elastic rings attached along the rigid body. The number of elastic rings is equal to the number of pins to allow the pin holder to selectively hold a pin in one of a raised position and a lowered position, for a predefined time.

The pins are contacted and held with the elastic rings prior to the pins leaving a surface of each actuator, where an axial movement of each pin is prevented to allow each pin to move underneath the user's finger, where the touched pins continuously leave a reading area of the braille cells. The pins are released via moving the assigned pin holders in a reverse direction until the elastic rings of the pin holders are decompressed. In an embodiment, the driving assembly is a belt drive. In an embodiment, the predefined path is along the belt drive, where a belt is driven around at least two pulleys disposed at a distance from each other, and one of the pulleys is driven by an electric motor to drive the belt across the two pulleys.

In an embodiment, the braille cells are attached to the belt, and the movement of the belt driven by the pulleys allow the pins to be in continuous contact with the cutaneous senses of the user's fingers. In an embodiment, the tactile display apparatus further comprises a body comprising multiple bumps, where each bump is configured to induce movement of each pin holder along the defined path. In an embodiment, the movement of each pin holder causes the elastic rings of each pin holder to be compressed to fix the pins in their status-quo. In an embodiment, one of the bumps is configured to push each holder in an opposite direction, where the elastic rings regain initial decompression status and the pins can have linear motion along their central axis. In an embodiment, the movement of each pin holder through the slot is one or a combination of a linear motion, sliding motion, and a rotary motion. In an embodiment, the braille cells are mounted on a circular disc, where the pins are positioned in each braille cell in a radially disposed orientation across the disc.

One aspect of the present disclosure is directed to a tactile display apparatus configured to render information to a user. The tactile display apparatus comprises (a) a plurality of braille cells attached adjacent to each other along a predefined path, wherein the braille cells are configured to be moved periodically at a predefined speed via a driving assembly; (b) a set of pins housed within first slots positioned on upper surface of each of the braille cells, the pins configured to be selectively actuated by one or more actuators in contact with each of the pins, wherein the motion of the braille cells allow the user to contact the pins via cutaneous senses of the user's fingers to read the information represented by the arrangement of the pins; and (c) a set of pin holders inserted along second slots positioned on the braille cells, wherein the pin holders are configured to be moved along a defined path to contact the pins in a substantially perpendicular direction, each pin holder comprising: (i) a rigid body; and (ii) a plurality of elastic rings attached along the rigid body, wherein the number of elastic rings is equal to the number of pins to allow the pin holder to selectively hold a pin in one of a raised position and a lowered position, for a predefined time.

In one embodiment, the driving assembly is a belt drive. In another embodiment, the predefined path is along the belt drive, wherein a belt is driven around at least two pulleys disposed at a distance from each other, and one of the pulleys is driven by an electric motor to drive the belt across the two pulleys. In one embodiment, the braille cells are attached to the belt, and the movement of the belt driven by the pulleys allow the pins to be in continuous contact with the cutaneous senses of the user's fingers.

In one embodiment, the tactile display apparatus further comprises a body comprising multiple bumps, where each bump is configured to induce movement of each pin holder along the defined path. In one embodiment, the movement of each pin holder causes the elastic rings of each pin holder to be compressed to fix the pins in their status-quo. In one embodiment, one of the bumps is configured to push each holder in an opposite direction, where the elastic rings regain initial decompression status and the pins can have linear motion along their central axis. In one embodiment, the movement of each pin holder through the slot is one or a combination of a linear motion, sliding motion, and a rotary motion. In another embodiment, the braille cells are mounted on a circular disc, where the pins are positioned in each braille cell in a radially disposed orientation across the disc.

A method for selectively adjusting pins on a tactile display apparatus, to allow a user to retain the position of the pins for a predetermined amount of time, the method comprising: (a) providing the tactile display apparatus comprising: (i) a plurality of braille cells attached adjacent to each other along a predefined path, wherein the braille cells are configured to be moved periodically at a predefined speed via a driving assembly; (ii) a set of pins housed within first slots positioned on upper surface of each of the braille cells, the pins configured to be selectively actuated by one or more actuators in contact with each of the pins, wherein the motion, such as, a linear or a rotary motion, of the braille cells allow the user to contact the pins via cutaneous senses of the user's fingers to read the information represented by the arrangement of the pins; and (iii) a set of pin holders inserted along second slots positioned on the braille cells, wherein the pin holders are configured to be moved along a defined path to contact the pins, each pin holder comprising: (iii-a) a rigid body; and (iii-b) a plurality of elastic rings attached along the rigid body, wherein the number of elastic rings is equal to the number of pins to allow the pin holder to selectively hold a pin in one of a raised position and a lowered position, for a predefined time; (b) positioning the pins and the pin holders in braille cells through respective slots, wherein the total number of the actuators is proportional to the number of rows in a braille character; (c) providing a flat member comprising a sloping surface; (d) moving the braille cell in a predefined direction, wherein the set of pins of the braille cell are moved upward via the sloping surface; (e) deciding via a micro controller whether a first pin is to be raised or not raised, to selectively allow the actuator to sustain the pin in the raised position, where the actuator moves upward and prevents the pin from dropping, or remains stationary to allow the pin to drop down via gravity; and (f) contacting the pin with the pin holder to hold the pin in position by pressing the elastic rings against the pin, thereby allowing a user to retain the position of the pins for a predetermined amount of time.

In one embodiment, the tactile display apparatus further comprises a body comprising multiple bumps, where each bump is configured to induce movement of each pin holder along the defined path. In one embodiment, the movement of each pin holder causes the elastic rings of each pin holder to be compressed to fix the pins in their status-quo. In one embodiment, one of the bumps is configured to push each holder in an opposite direction, where the elastic rings regain initial decompression status and the pins can have linear motion along their central axis. In one embodiment, the movement of each pin holder through the slot is one or a combination of a linear motion, sliding motion, and a rotary motion.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

DETAILED DESCRIPTION

The present invention generally relates to tactile devices, which are used to help visually challenged people recognize text information into braille codes, and more particularly relates to a tactile display apparatus, which is configured to continuously refresh the display according to the text information fed to the braille assembly.

One aspect of the present disclosure is directed to a tactile display apparatus configured to render information to a user, the tactile display apparatus comprising: (a) a plurality of braille cells attached adjacent to each other along a predefined path, wherein the braille cells are configured to be moved periodically at a predefined speed via a driving assembly; (b) a set of pins housed within first slots positioned on an upper surface of each of the braille cells, the pins configured to be selectively actuated by one or more actuators in contact with each of the pins, wherein the motion of the braille cells allow the user to contact the pins via cutaneous senses of the user's fingers to read the information represented by the arrangement of the pins; and (c) a set of pin holders inserted along second slots positioned on the braille cells, wherein the pin holders are moved along a defined path to contact the pins, each pin holder comprising: (i) a rigid body; and (ii) a plurality of elastic rings attached along the rigid body, wherein the number of elastic rings is equal to a predefined number of the pins, wherein the pins are contacted and held with the elastic rings prior to the pins leaving a surface of each actuator, wherein an axial movement of each pin is prevented to allow each pin to move underneath the user's finger, wherein the touched pins continuously leave a reading area of the braille cells, and wherein the pins are released via moving the assigned pin holders in a reverse direction until the elastic rings of the pin holders are decompressed.

Figure 1:
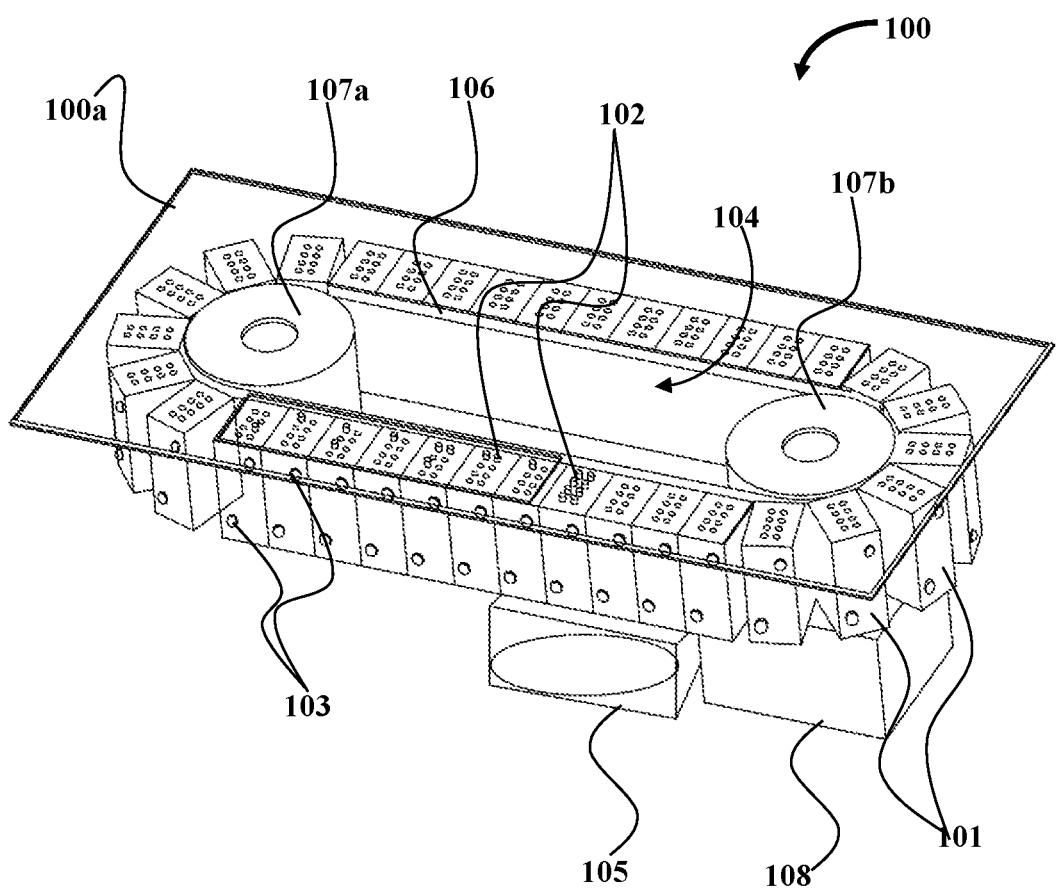
FIG. 1 illustrates an isometric view of the tactile display apparatus.

FIG. 1 illustrates an isometric view of the tactile display apparatus 100. The tactile display apparatus 100 disclosed here renders information to a user via braille codes, which are primarily used for visually challenged users. The tactile display apparatus 100 which is assembled on a cover member 100a, comprises multiple braille cells 101 attached adjacent to each other along a predefined path, a set of pins 102 housed within first slots 109a positioned on upper surface of each of the braille cells 101, and a set of pin holders 103 inserted along second slots 109b positioned on the braille cells 101, as further shown in FIG. 3.

The braille cells 101 are configured to be moved periodically at a predefined speed via a driving assembly 104, for example, a belt drive. The pins 102 are configured to be selectively actuated by one or more actuators 105 in contact with each of the pins 102, where the motion, such as, a linear or a rotary motion, of the braille cells 101 allow the user to contact the pins 102 via cutaneous senses of the user's fingers to read the information represented by the arrangement of the pins 102. Thus, the braille cells 101 are continuously refreshed by the selective actuation of the actuators 105 to move the pins 102.

Figure 4:
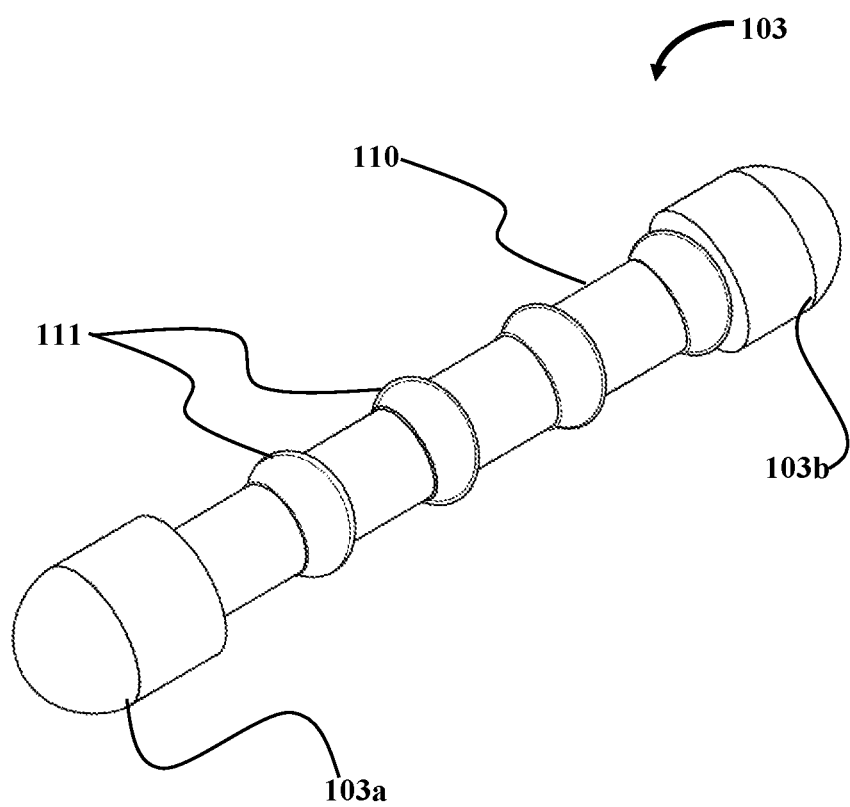
FIG. 4 illustrates a schematic view of the pin holder, which comprises of the rigid body, and flexible parts, which comprise the elastic rings.

As shown in FIGS. 1 and 4, the pin holders 103 are configured to be moved along a defined path to contact the pins 102 in a substantially perpendicular direction, each pin holder 103 comprises a rigid body 110, and multiple elastic rings 111 attached along the rigid body 110. The number of elastic rings 111 is equal to the number of pins 102 to allow the pin holder 103 to selectively hold a pin 102 in one of a raised position and a lowered position, for a predefined time.

The pins 102 are contacted and held with the elastic rings 111 prior to the pins 102 leaving a surface of each actuator 105, where an axial movement of each pin 102 is prevented to allow each pin 102 to move underneath the user's finger, where the touched pins 102 continuously leave a reading area of the braille cells 101. The pins 102 are released via moving the assigned pin holders 103 in a reverse direction until the elastic rings 111 of the pin holders 103 are decompressed. In an embodiment, the driving assembly 104 is, for example, a belt drive as shown in FIG. 1. In an embodiment, the predefined path is along the belt drive 104, wherein a belt 106 is driven around at least two pulleys 107a and 107b disposed at a distance from each other, and one of the pulleys 107a and 107b is driven by an electric motor 108 to drive the belt 106 across the two pulleys 107a and 107b.

The tactile display apparatus 100 provides a new solution for reading texts, and it works in a way that there are one or more suitable areas assigned for the reading, and the user can hold his/her hand still in a constant desired position. The movement of the braille cells 101, or in other words, the linear motion of the belt 106, which facilitates the rotation of the circular disc or a drum, allows the braille cells 101 to move underneath the user's hand. Such movement of the braille cells 101 under the user's hand allow the information represented on the pins 102 of the braille cells 101 to be read through the cutaneous senses of the user's finger. Unless and until the user does not press the stop button, the text moves uninterruptedly with an adjustable speed underneath his/her fingers.

According to the tactile display apparatus 100, an independent actuator 105 does not control the amount of displacement of each braille pin 102. Based on the method which is used to adjust the pins 102 in their desired positions, there will be 4 actuators 105 in a first method of actuation for eight-dot braille characters as explained in FIGS. 8A-8C, and 8 actuators in the second method of actuation for eight-dot braille characters as explained in FIGS. 9A-9C, that are installed in specific positions to adjust all the pins 102 of any braille cell 101 in turn. While the braille cells 101 move, the pins 102 of each braille cell 101 are adjusted independently by the introduced actuators 105, and held in respective positions by using pin holders 103. Therefore, the held pins 102 are prevented from axial movement, and are enabled to withstand the pressure from the user's finger when they are touched.

One aspect of the tactile display apparatus 100 is the firm retention of the pins 102 of each braille cell 101 in the preferred position along the required section for reading. In order to retain the specific position of the pins 102 in each braille cell 101, a supporting piece or the pin holder 103 is utilized. This pin holder 103 enables the pins 101 to have free axial movement when required and to be held firm in place without any axial displacement whenever needed. Indeed, with the movement of each pin holder 103 along the defined path and compression of elastic rings 111, the pins 102 are restrained from any movement. When required, with the movement of pin holders 103 in the reverse direction, the elastic rings 111 regain their initial decompression status and the pins 102 are allowed to have motion along their central axis.

Figure 5:
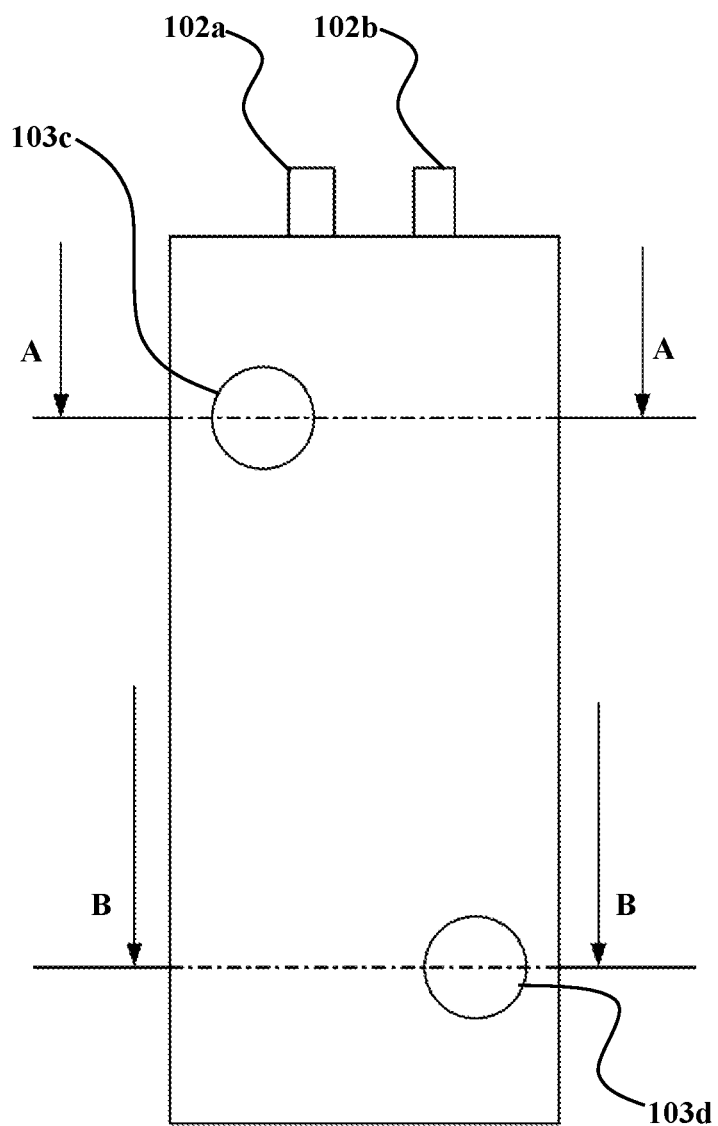
FIG. 5 illustrates a front view of a braille cell, with the pins and the pin holders are located in their respective position.

The pins 102 are kept firmly in their preferred position until the user reads the required text and then they are moved away from the specific section assigned to reading, and then the pin holders 103 releases the pins 102 and they will be able to move axially. There are two paths, shown proximal to A and B in FIG. 5, and two pin holders 103a and 103b for each braille cell 101, as shown in FIGS. 1 and 5.

In an embodiment, the tactile display apparatus 100 comprises one or a more motors 108, which are utilized to maintain rotational movement. Each electric motor 108 is fed from an external power supply, and it usually has high torque at low R.P.M (Revolutions per Minute.) The best-suited electric motors 108, for example, is the type that has adjustable speed and has good immunity against noise and spurious signals.

A central processor, such as, micro-board or host computer, is used to convert the text to special braille codes and provide motion commands to the actuators 105. This processor can be fed from an internal circuit that lets the user to utilize the device independent from P.C. In the tactile display apparatus 100, some actuators 105 are used to provide the axial movement for the pins 102 of each braille cell 101. Various kinds of linear/rotational actuators 105 can be used for this purpose among which the electromagnetic actuators are cheaper. The piezoelectric actuators 105, the disc and motor moving mechanisms, such as, a drive mechanism and a follower element, can also be used to provide axial movement in pins 102.

In one embodiment, the driving assembly is a belt drive. In another embodiment, the predefined path is along the belt drive, wherein a belt is driven around at least two pulleys disposed at a distance from each other, and one of the pulleys is driven by an electric motor to drive the belt across the two pulleys. In a related embodiment, the braille cells are attached to the belt, and the movement of the belt driven by the pulleys allow the pins to be in continuous contact with the cutaneous senses of the user's fingers.

In one embodiment, the tactile display apparatus further comprises a body comprising a plurality of bumps, wherein each bump is configured to induce movement of each pin holder along a defined path. In another embodiment, the movement of each pin holder causes the elastic rings of each pin holder to be compressed to fix the pins in their status-quo. In one embodiment, one of the bumps is configured to push each pin holder in an opposite direction, wherein the elastic rings regain initial decompression status and the pins are configured for linear motion along their central axis. In one embodiment, the movement of each pin holder through the second slot is one or combination of a linear motion, a sliding motion, and a rotary motion. In one embodiment, the braille cells are mounted on a circular disc, wherein the pins are positioned in each braille cell in a radially disposed orientation across the circular disc.

Figure 2:
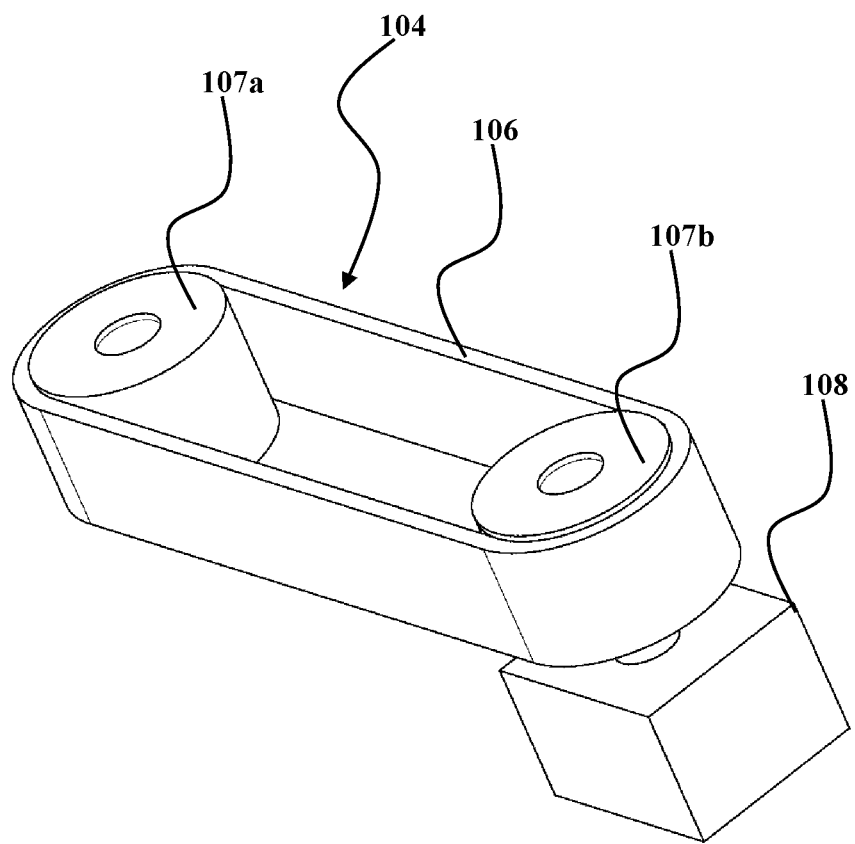
FIG. 2 illustrates a belt-and-pulley mechanism, or a belt drive as shown, on which the braille cells are installed, with respect to FIG. 1.

FIG. 2 illustrates a belt-and-pulley mechanism, or a belt drive 104 as shown, on which the braille cells 101 are installed, with respect to FIG. 1. In an embodiment, the predefined path of arrangement of braille cells 101, as explained in FIG. 1, is along the belt drive 104. Here, a belt 106 is driven around two pulleys 107a and 107b, which are disposed at a distance from each other, and one of the pulleys 107b is driven by the electric motor 108 to drive the belt across the two pulleys 107a and 107b.

A shaft of the electric motor 108 is fixedly connected to the hub of one 107b of the pulleys 107a and 107b, and the torque is transferred from the motor 108 to the pulley 107a to drive the pulley 107a, whereby the belt 106 containing the braille cells 101 are driven around the pulleys 107a and 107b. Here, a blind user can place his/her hands constantly at one spot along the pathway of the braille cells 101 which allow them to read the written information conveyed by the encoded pins 102.

Figure 3:
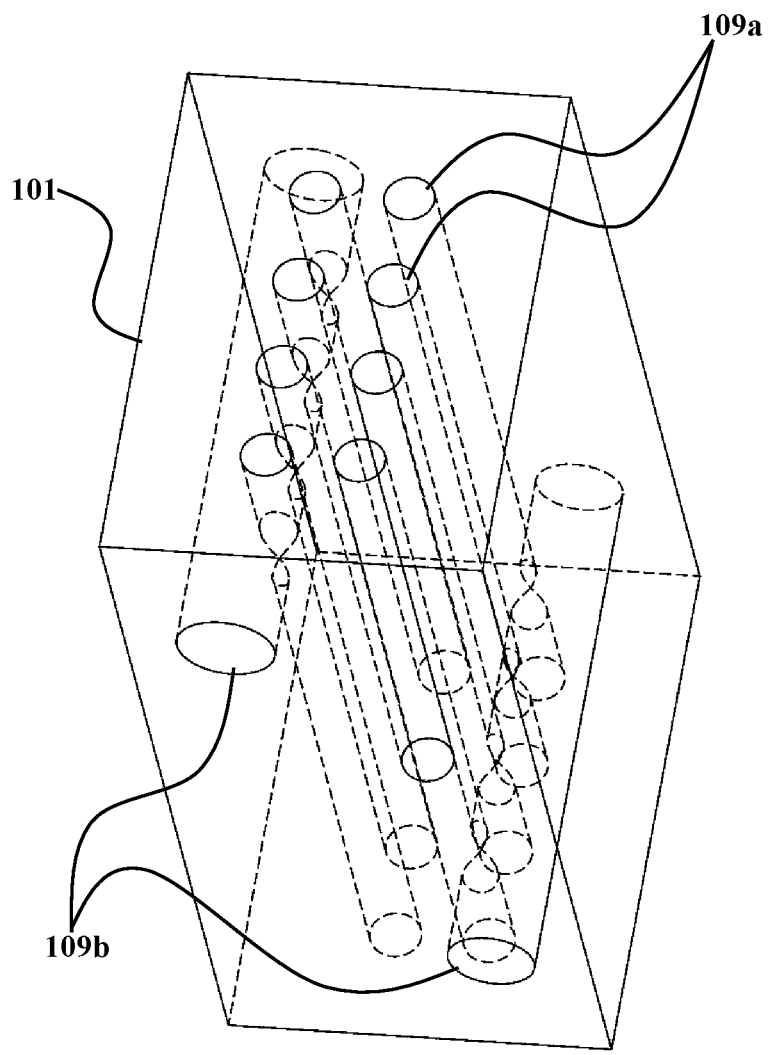
FIG. 3 illustrates a schematic view of a braille cell, where the pins are positioned in the respective slots.

FIG. 3 illustrates a schematic view of a braille cell 101, where the pins 102 as shown in FIG. 1, are positioned in respective slots 109a and 109b. The braille cell 101 is a generally cuboidal structure having numerous slots 109a and 109b to securely position the pins 102 and the pin holders 103. The pins 102 are positioned in the slots 109a. The pin holders 103 are placed in another set of slots 109b, and are configured to have rotational and/or sliding movement.

FIG. 4 illustrates a schematic view of the pin holder 103, which comprises of the rigid body 110, and flexible parts, which comprise the elastic rings 111. The pin holder 103 is inserted through the slots 109b as shown in FIG. 3. In an embodiment, the tactile display apparatus 100 further comprises a body comprising multiple bumps, where each bump is configured to induce movement of each pin holder 103 along the defined path. The elastic rings 111 of the pin holder 103 are disposed along the length of the rigid body 110, and the pin holder 103 moves axially and holds the pins 101 at any desired position.

The raised distal ends 103a and 103b on the rigid body 110 determines the movement of each pin holder 103 along a defined path. In an embodiment, the movement of each pin holder 103 causes the elastic rings 111 of each pin holder 103 to be compressed to fix the pins 102 in their status-quo. In an embodiment, one of the bumps is configured to push each pin holder 103 in an opposite direction, where the elastic rings 111 regain initial decompression status and the pins 102 can have linear motion along their central axis. In an embodiment, the movement of each pin holder 103 through each slot 109a and 109b is one or a combination of a linear motion, sliding motion, and a rotary motion. There are many other mays to move pin holders 103, but the proposed idea using the bumps is simple and low-cost. For example, some active mechanisms, such as, linear actuators may be used to move each pin holder 103 in a desired direction.

FIG. 5 illustrates a front view of a braille cell 101, with the pins 102a and 102b, and the pin holders 103c and 103d are located in their respective position. As shown here, the pin holders 103c and 103d are diagonally disposed across the surface of the braille cell 101, and are inserted through the slots 109b as explained in FIG. 3. The pins 102a on the left side contact the elastic rings 111 of pin holder 103c from a generally upper section of the pins 102a, and the pins 102b on the right side contact the elastic rings 111 of the pin holder 103d from a substantially lower section of the pins 102b. The sections A-A and B-B are shown here in FIG. 5 and are further explained in FIG. 6.

Figure 6:
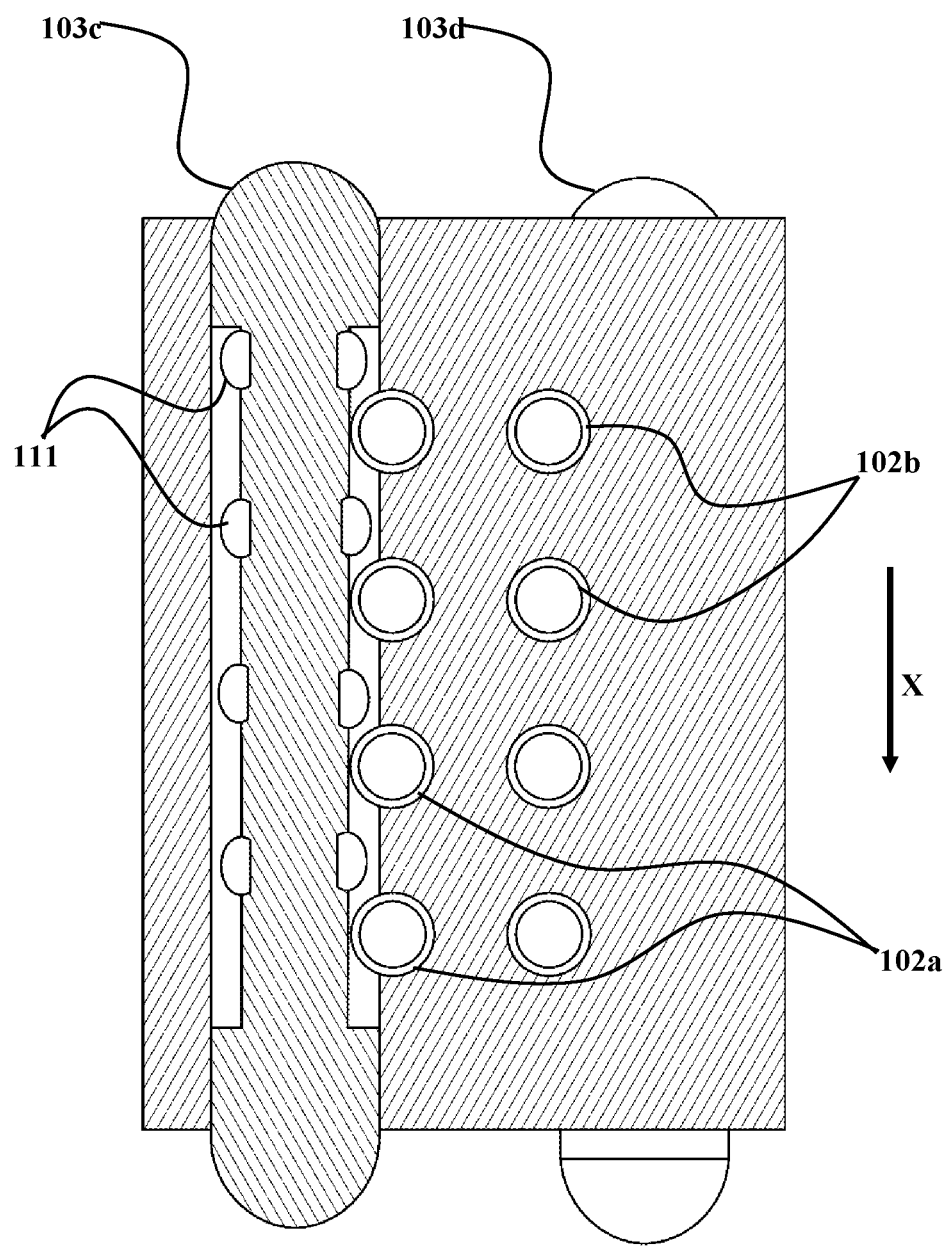
FIG. 6 illustrates a cross sectional view A-A of FIG. 5, showing the contact of the pin holder with the pins, where the pins can move freely because the elastic rings are not in contact with the pins.
Figure 7:
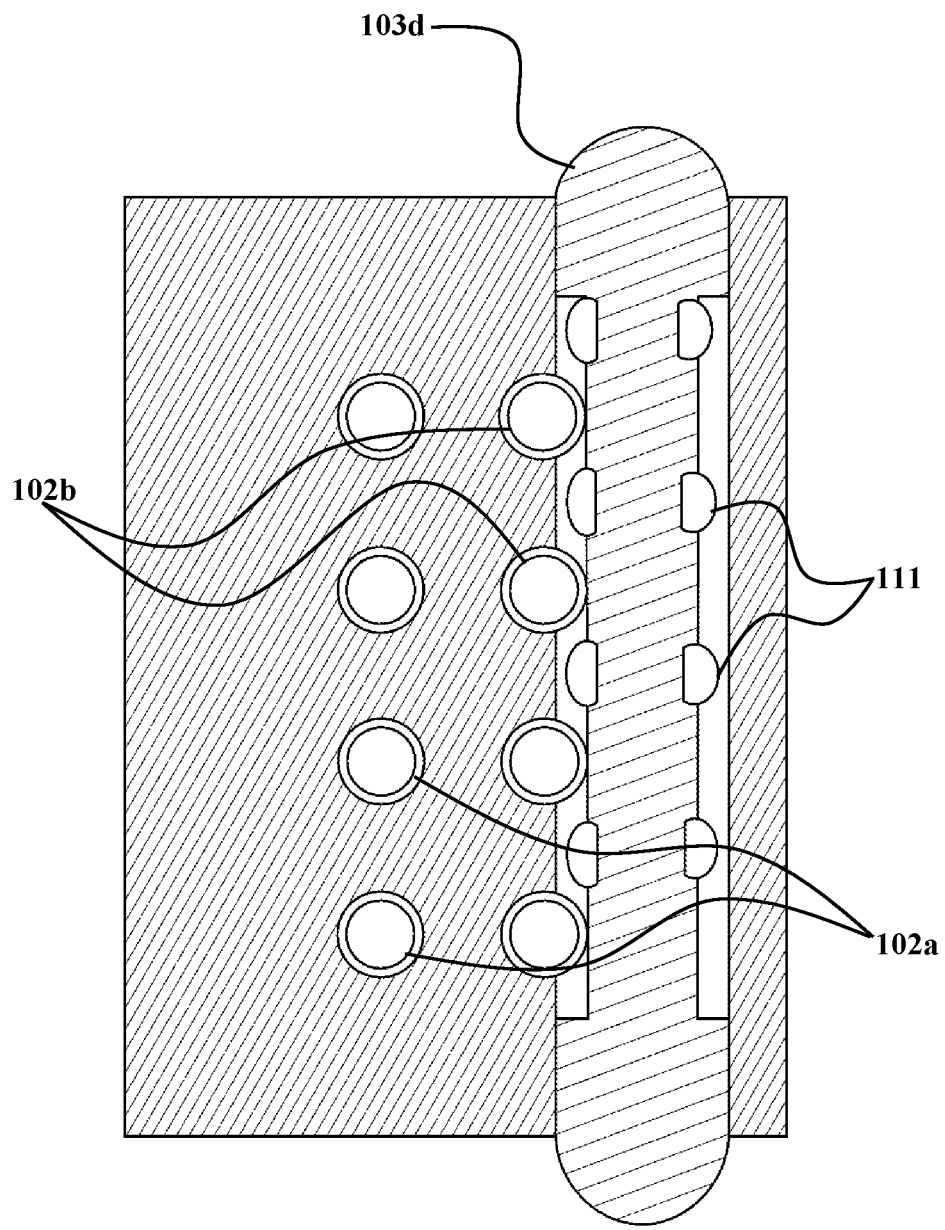
FIG. 7 illustrates a cross section view B-B of FIG. 5, where the pins can move freely since the elastic rings are not in contact with the pins.

FIG. 6 illustrates a top cross sectional view A-A of the braille cell 101 in FIG. 5, showing the contact of the pin holder 103c with the pins 102a, where the pins 102a can move freely because the elastic rings 111 are not in contact with the pins 102a. The pin holder 103a shown here in FIG. 6 is the one which is positioned proximal to the upper section of the braille cell 101, where the section line A-A is cut across the upper section as shown in FIG. 5. Similarly, FIG. 7 illustrates a cross section view B-B of the braille cell 101 in FIG. 5, where the pins 102b can move freely since the elastic rings 111 are not in contact with the pins 102b. The pin holder 103d shown here in FIG. 6 is the one, which is positioned proximal to the lower section of the braille cell 101, where the section line B-B is cut across the lower section as shown in FIG. 5.

In both FIGS. 6 and 7, when each of the pin holders 103c and 103d moves along the x-direction, the elastic rings 111 are configured to compress and hold the pins 102a and 102b, thereby preventing them from any axial movement. Thus, the elastic rings 111 of the pin holders 103c and 103d compressively hold the actuated pins 102a and 102b, to fixedly position the pins 102a and 102b in a specific position.

Figure 8A:
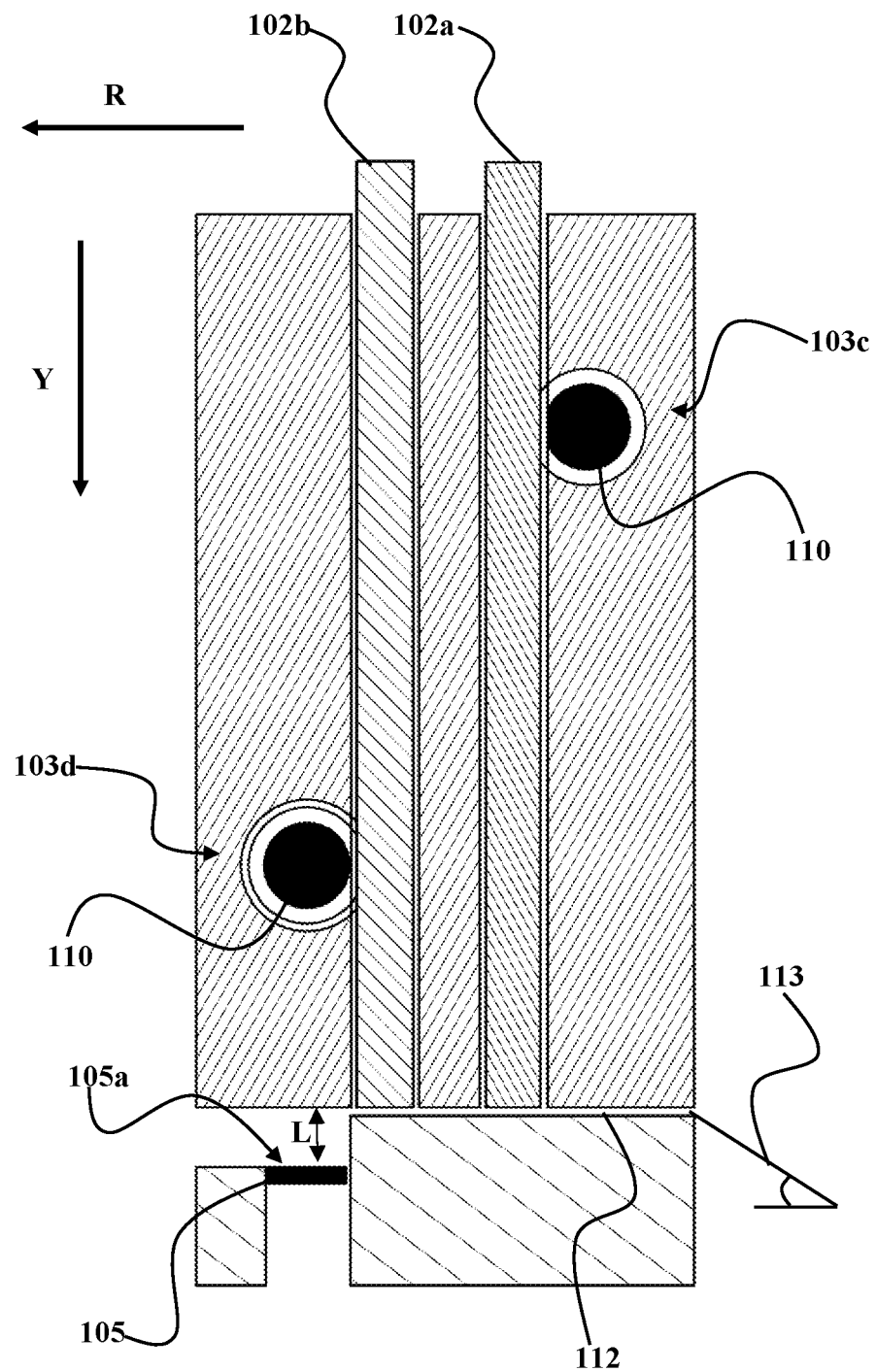
FIG. 8A illustrates a sectional view of the braille cell, showing a first method which is used to adjust the pins in their desired positions, where the pin holders, and pins are shown in the first step before adjusting the pins.
Figure 8B:
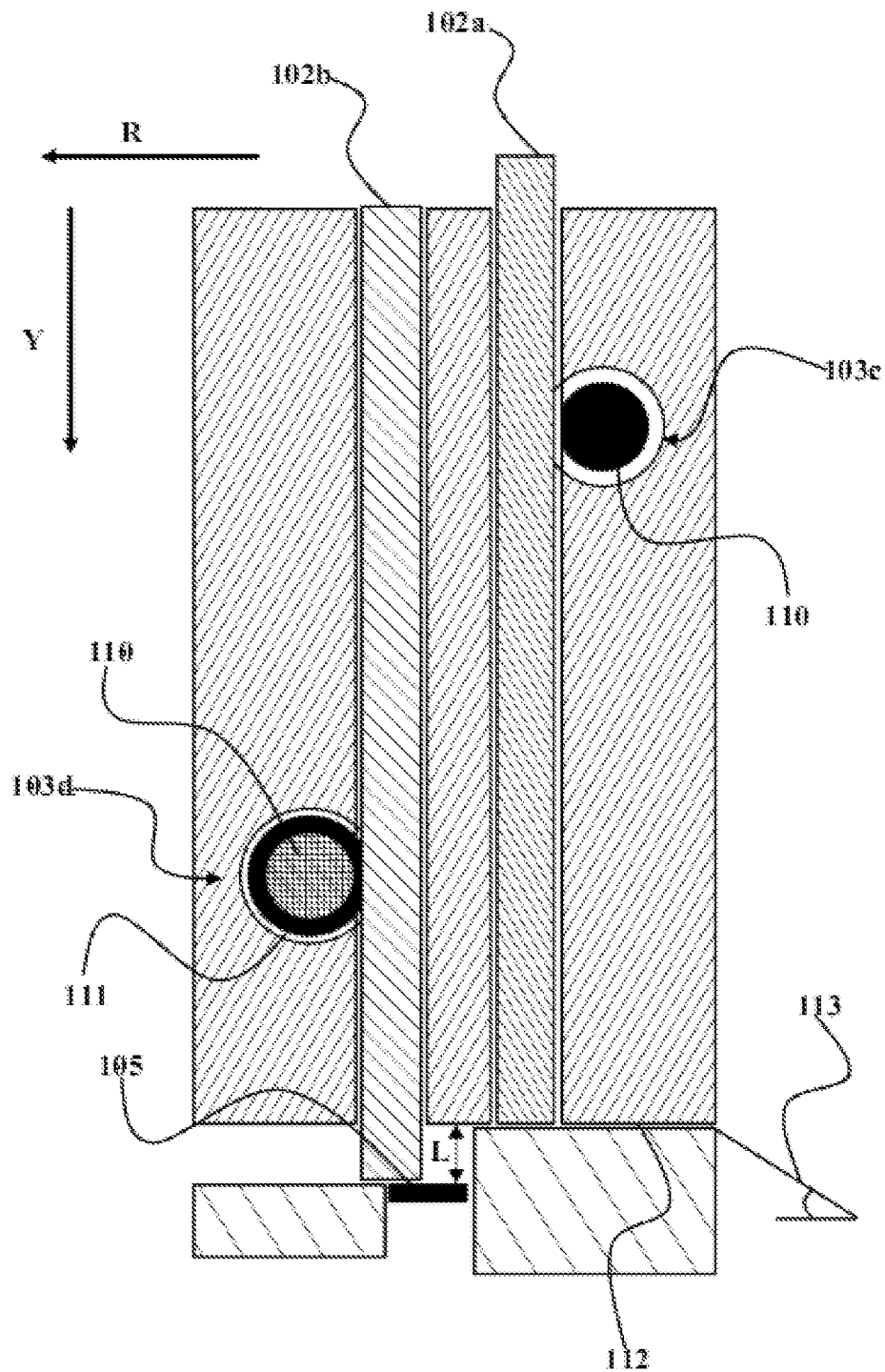
FIG. 8B illustrates a continuation of the first method, where the actuators, pin holders, and pins are adjusted in a second step.
Figure 8C:
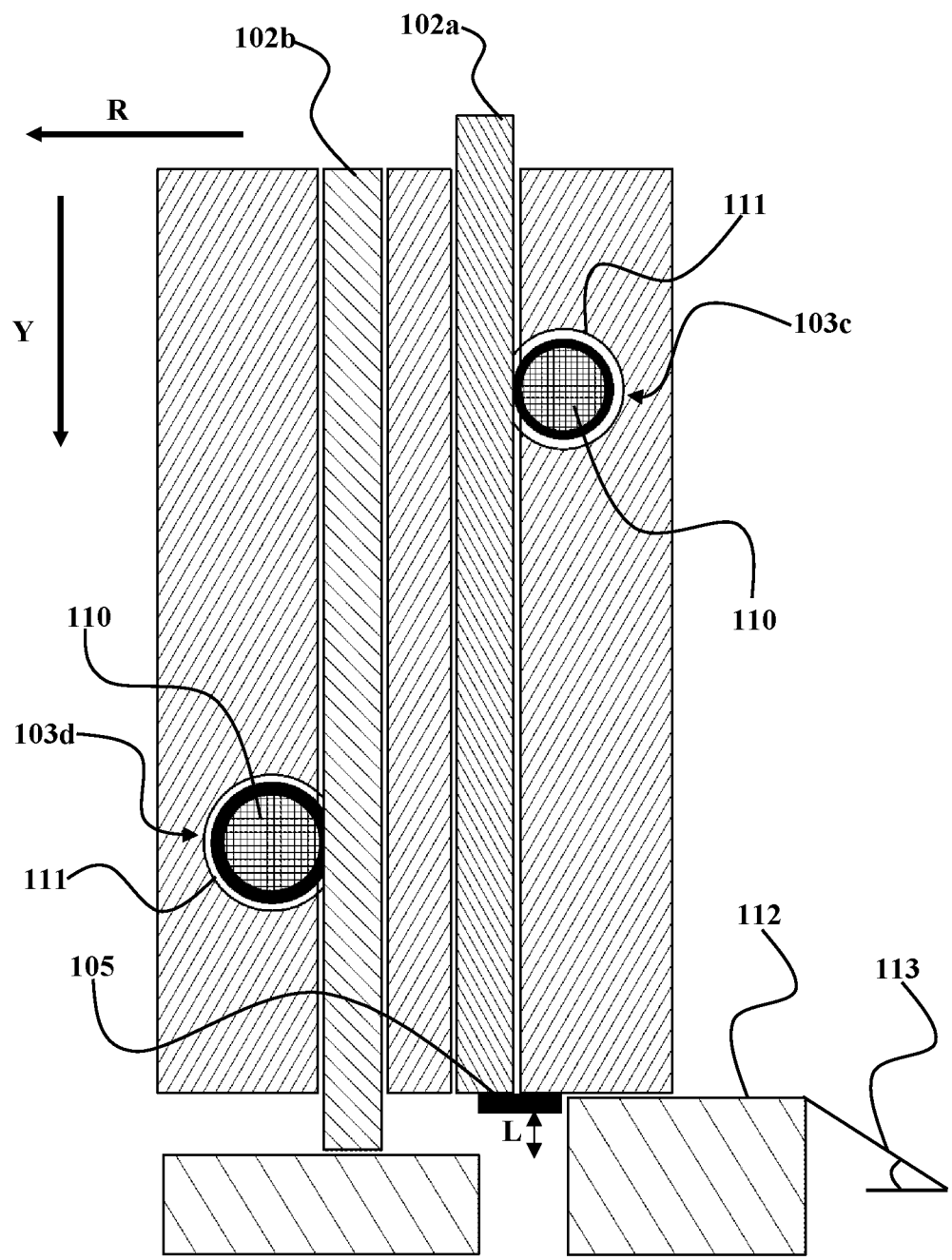
FIG. 8C illustrates a continuation of the first method, where the actuators, pin holders, and pins are shown, when the pin is adjusted in a third step.

Referring to FIGS. 8A-8C, FIG. 8A illustrates a sectional view of the braille cell 101, showing a first method which is used to adjust the pins 102a and 102b in their desired positions, where the pin holders 103c and 103d, and pins 102a and 102b are shown in the first step before adjusting the pins 102a and 102b, FIG. 8B illustrates a continuation of the first method, where the actuators 105, pin holders 103c and 103d, and pins 102a and 102b are adjusted in a second step, and FIG. 8C illustrates a continuation of the first method, showing the actuators 105, pin holders 103c and 103d, and pins 102a and 102b, when the pins 102a and 102b are adjusted in a third step.

The main features of this method are as follows, initially the pin holders 103c and 103d are positioned inside each braille cell 101. Here in this first method, the total number of actuators 105 is proportional to the number of rows in a braille character, that is, an eight-dot braille character has two columns and four rows. Now, the two pins 102a and 102b of a row are configured to have the same height.

With reference to FIGS. 8A-8C, a first flat member 112 comprising a sloping surface 113 allows the uniform rise of pins 102a and 102b with a low speed. The pins 102a and 102b are completely raised when the pins 102a and 102b are placed on the first flat member 112. The actuator 105 moves along the distance L as is needed. The FIGS. 8A-8C show how the first method was used to adjust pins 102a and 102b in their desired positions. The procedure of the first method is as follows, as a braille cell 101 moves in the R-direction, each two pins 102a and 102b of a braille cell 101 move upward because of the sloping surface 113 as shown in FIG. 8A. A decision is made via a micro controller whether the first pin 102b should be kept raised or not. If yes, the actuator 105 will move upward, and if not, the actuator 105 will not move, or is not activated. For example, assume that pin 102b should fall, then as the braille cell 101 moves, from the position shown in FIG. 8A, in the R-direction, the actuator 105 is not activated and the pin 102b falls which is shown in FIG. 8B.

As the braille cell 101 keeps going in the R-direction, just before the pin 102b leaves the actuator's 105 surface 105a shown in FIG. 8A, the pin holder 103b comes into contact with the pin 102b and holds it in position, that is, the elastic ring 111 presses the pin 102b, as shown in FIG. 8B. The process described above is repeated for all pins 102a and 102b in the respective columns, one-by-one. In a working example, assume after that the pin 102b was adjusted as shown in FIG. 8B, and if the user wants the next pin 102a to stay raised. Therefore, in such a situation, as the braille cell 101 moves in the R-direction, the actuator 105 moves upward and prevents the pin 102a from falling, as shown in FIG. 8C. As the braille cell 101 keeps moving in the R-direction, and just before the pin 102a leaves the actuator surface 105a, another pin holder 103c comes into contact with the pin 102a and holds the pin 102a, thereby preventing the pin 102a from moving axially, as shown in FIG. 8C.

To summarize the first method, the braille cells 101 move in the R-direction continuously and during this process, each pin 102a and 102b rises before the actuators' 105 locations, because of the sloping surface 113. Then, the actuator 105 moves upward or stays idle, according to the order received from a micro controller. In the final stage, just before the pin 102b leaves the actuator's surface 105a, the elastic ring 111 makes a contact with the pin 102b and holds the pin 102b, thereby preventing any axial movement of the pin 102b. The adjusted pins 102a and 102b move underneath the user's finger, and senses with the cutaneous senses. As the braille cell 101 moves, the touched pins 102a and 102b leave the reading area, or the area where the user touches the text, and the assigned pin holders 103c and 103d move in the reverse direction till the elastic rings 111 of the pin holders 103c and 103d are decompressed, and the pins 102a and 102b are released. This methodology is repeated for all pins 102a and 102b one-by-one.

Figure 9A:
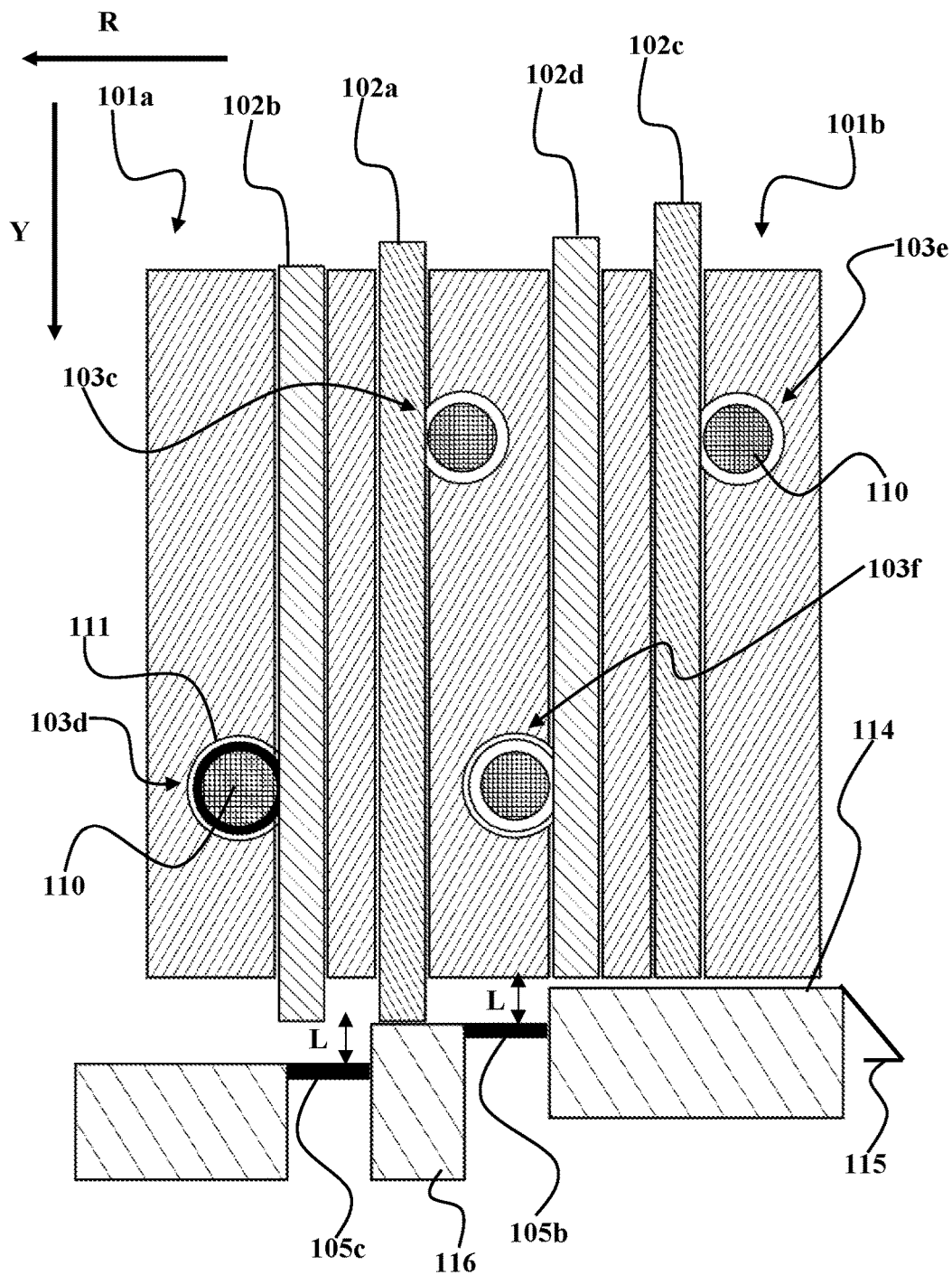
FIG. 9A illustrates a second method is used to adjust the pins in their desired positions, where the actuators, pin holders, and pins are shown, one-step before adjusting the pins.
Figure 9B:
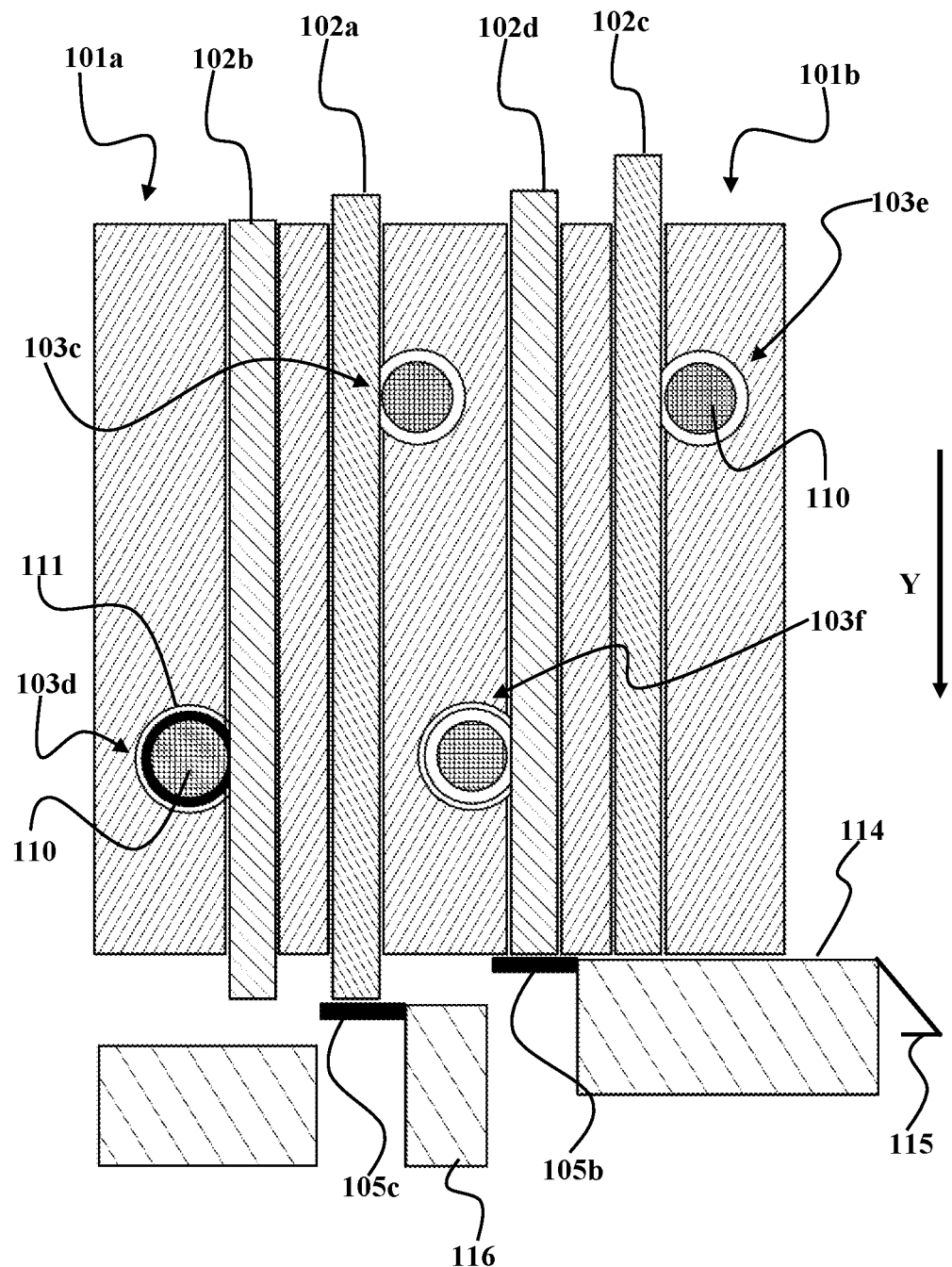
FIG. 9B illustrates a continuation of second method is used to adjust the pins in their desired positions, where the pins are going to be adjusted by the actuators respectively.
Figure 9C:
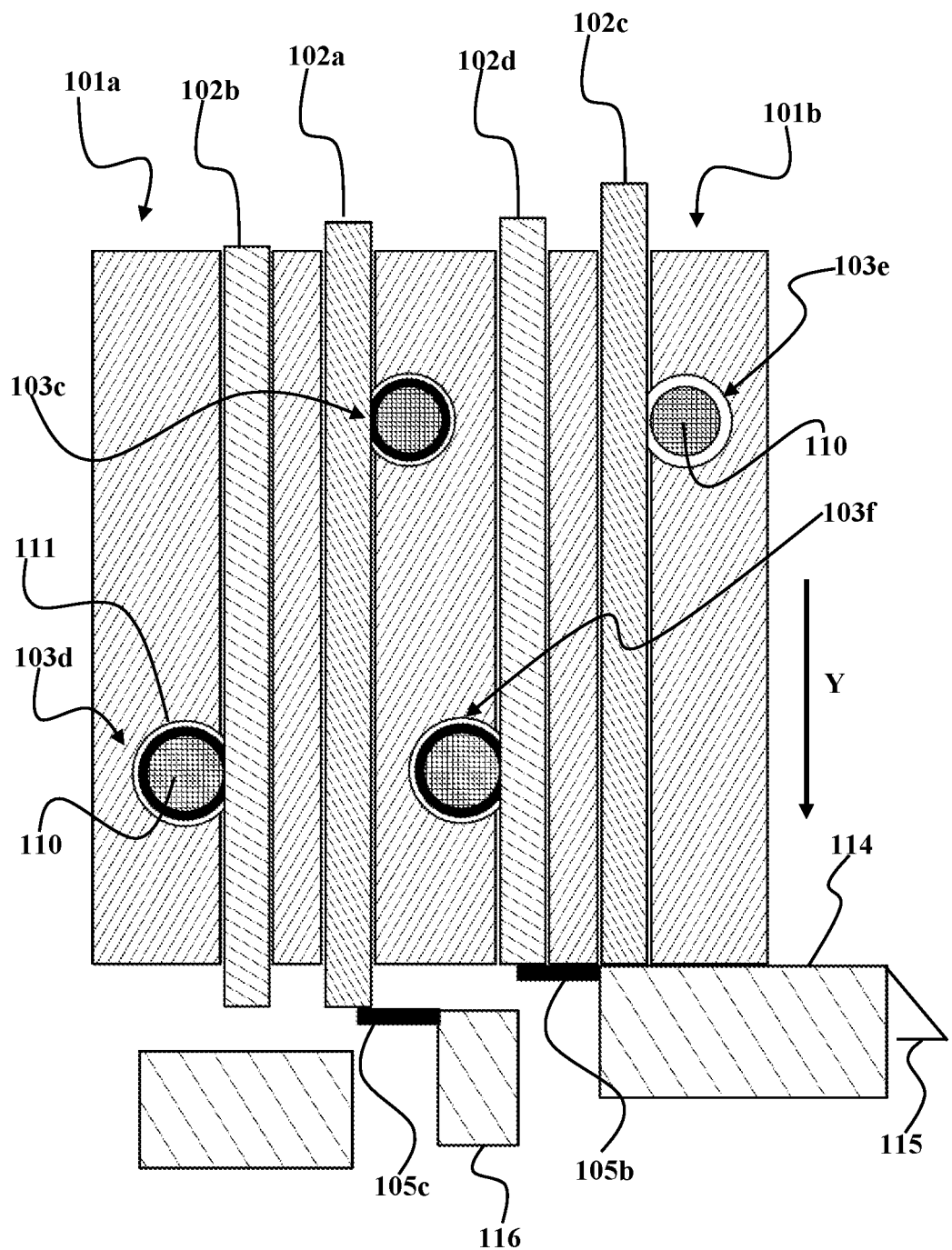
FIG. 9C illustrates a continuation of second method, where the elastic rings hold the pins, and prevent axial movement in the Y direction.

Referring to FIGS. 9A-9C, FIG. 9A illustrates a second method is used to adjust the pins 102a, 102b, 102c and 102d in their desired positions, where the actuators 105b and 105c with the pin holders 103c, 103d, 103e and 103f, are as shown, one step before adjusting the pins 102a, 102b, 102c and 102d, FIG. 9B illustrates a continuation of second method is used to adjust the pins 102a, 102b, 102c and 102d in their desired positions, where the pins 102a, 102b, 102c and 102d are going to be adjusted by the actuators 105b and 105c respectively, and FIG. 9C illustrates a continuation of second method, where the elastic rings 111 hold the pins 102a, 102b, 102c and 102d, and prevent axial movement in the Y direction. The main features of this method are as follows: The two pair of pin holders 103c and 103d, and 103e and 103f, which are placed in each braille cell 101a and 101b. The total number of actuators 105b and 105c is equal to the number of dots in a braille character, for example, an eight-dot braille character has eight dots. Two pins of a row may have different heights, for example, pin 102a is longer than pin 102b, and pin 102c is longer than pin 102d as shown in FIGS. 9A-9C.

There is second flat member 114 sloping surface 115 which is configured to uniformly raise at least one of the pins 102a and 102b, or the pins 102c and 102d with a low speed. The pins 102a, 102c, and the pins 102b, 102d are completely raised when they are positioned on the second flat member 114. There is a third flat member 116, and the longer pins 102a and 102c are raised when are placed on the third flat member 116. The actuator 105b moves along the distance L to adjust shorter pins 102b and 102d, and another actuator 105c is used to adjust longer pins 102a and 102c, as required.

FIGS. 9A-9C exemplarily illustrates the second method was used to adjust pins 102a and 102c, and the pins 102b and 102d in their desired positions. As shown in FIG. 9A, two braille cells 101a and 101b are located beside each other to show the adjusting method proposed in this section. Here, the first actuator 105b adjusts the short pins 102b and 102d, and the second actuator 105c adjusts the long pins 102a and 102c. The procedure of the second method is as follows: As the braille cells 101a and 101b move in the R-direction, each of the two pins 102d and 102c of the braille cell 101b move upward because of the sloping surface 115 as shown in FIG. 9A.

A decision is made whether the shortest pin 102d is configured to be kept raised, or not. If it is a yes, then the actuator 105b will move upward, and if not, the actuator 105*b* is restrained from upward movement. For example, assume that the pins 102*d* and 102*a* should stay raised, then as the braille cells 101*a* and 101*b* move in the R-direction, the actuator 105*b* and 105*c* are activated, and the pins 102*d* and 102*a* stay raised which is shown in FIG. 9B. As the Braille cells 101*a* and 101*b* keep going in the R-direction, just before the pins 102*d* and 102*a* leaves the actuators' surfaces, a pin holders 103*c* and 103*f* makes contact with each of the pins 102*d* and 102*a*, and holds the pins 102*d* and 102*a* via the elastic ring 111 which presses the pins 102*d* and 102*a*, as shown in FIG. 9C. The process described above is repeated for all the pins 102*a*, 102*b*, 102*c* and 102*d* one-by-one.

To summarize the second method, the braille cells 101*a* and 101*b* move in the R-direction continuously, and during this process, the sloping surface 115 raises each pin 102*a*, 102*b*, 102*c* and 102*d* before the contact with the actuators 105*b* and 105*c*. Then, the first actuator 105*b* moves upward or stays still, according to the order received from a micro controller to adjust a short pins 102*d* and 102*b*, and long pins 102*a* and 102*c* just slip on the actuator's surface without any effect. Then, a long pin 102*a* falls on the third flat member 116 and in the next step, and another actuator 105*c* adjusts the long pin 102*a*.

In the final stage and just before the pins leave the actuators' 105*b* and 105*c* surfaces, the elastic rings 111 contact each one and hold them, preventing each pin 102*a*, 102*b*, 102*c* and 102*d* from axial movement. The adjusted pins 102*a*, 102*b*, 102*c* and 102*d* move underneath the user's finger, and are touched by him/her. As the braille cells 101*a* and 101*b* move, the touched pins 102*a*, 102*b*, 102*c* and 102*d* leave the reading area, where the user touches the text, and the assigned pin holders 103*c*, 103*d*, 103*e* and 103*f* move in the reverse direction till the elastic rings 111 are decompressed, and the pins 102*a*, 102*b*, 102*c* and 102*d* are released. This method is repeated for all the pins 102*a*, 102*b*, 102*c* and 102*d* one-by-one.

Another aspect of the present disclosure is directed to a method for selectively adjusting pins on a tactile display apparatus, the method comprising: (a) providing the tactile display apparatus comprising: (i) a plurality of braille cells attached adjacent to each other along a predefined path, wherein the braille cells are configured to be moved periodically at a predefined speed via a driving assembly; (ii) a set of pins housed within first slots positioned on an upper surface of each of the braille cells, the pins configured to be selectively actuated by one or more actuators in contact with each of the pins, wherein the motion of the braille cells allow the user to contact the pins via cutaneous senses of the user's fingers to read the information represented by the arrangement of the pins; and (iii) a set of pin holders inserted along second slots positioned on the braille cells, wherein the pin holders are configured to be moved along a defined path to contact the pins, each pin holder comprising: a rigid body, and a plurality of elastic rings attached along the rigid body, wherein the number of elastic rings is equal to a predefined number of the pins; (b) positioning the pins and the pin holders in the braille cells through their respective slots, wherein the total number of the actuators is proportional to the number of rows in a braille character; (c) providing a flat member comprising a sloping surface; (d) moving the braille cells in a predefined direction, wherein the set of pins of the braille cells are moved upward via the sloping surface; (e) deciding via a micro controller whether a pin is to be raised or not to be raised; (f) selectively allowing the actuator to sustain the pin in the raised position, wherein the actuator moves upward and prevents the pin from dropping, or remains stationary to allow the pin to drop down via gravity; (g) contacting and holding the pin with the elastic ring prior to the pin leaving the surface of the actuator; (h) preventing an axial movement of the pin and allowing the pins to move underneath the user's finger, wherein the touched pins continuously leave a reading area of the braille cells; and (i) releasing the pins via moving the assigned pin holders in a reverse direction until the elastic rings of the pin holders are decompressed.

Figure 10:
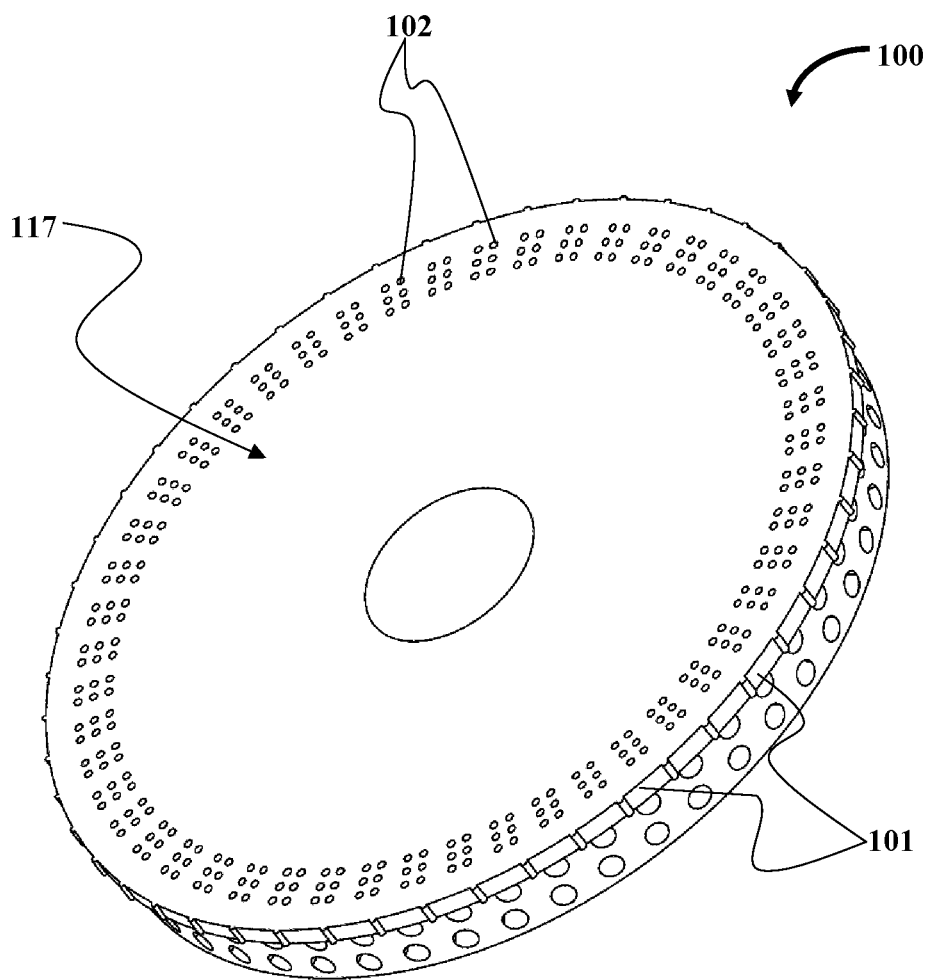
FIG. 10 illustrates a top perspective view of another embodiment of the tactile display apparatus, where the braille cells are installed on a circular disc.

FIG. 10 illustrates a top perspective view of another embodiment of the tactile display apparatus 100, where the braille cells 101 are installed on a circular disc 117. In an embodiment, the pins 102 are positioned in each braille cell 101 in a radially disposed manner to rotate the disc 117, for example, rotate the circular disc 117 via a motor.

Figure 11:
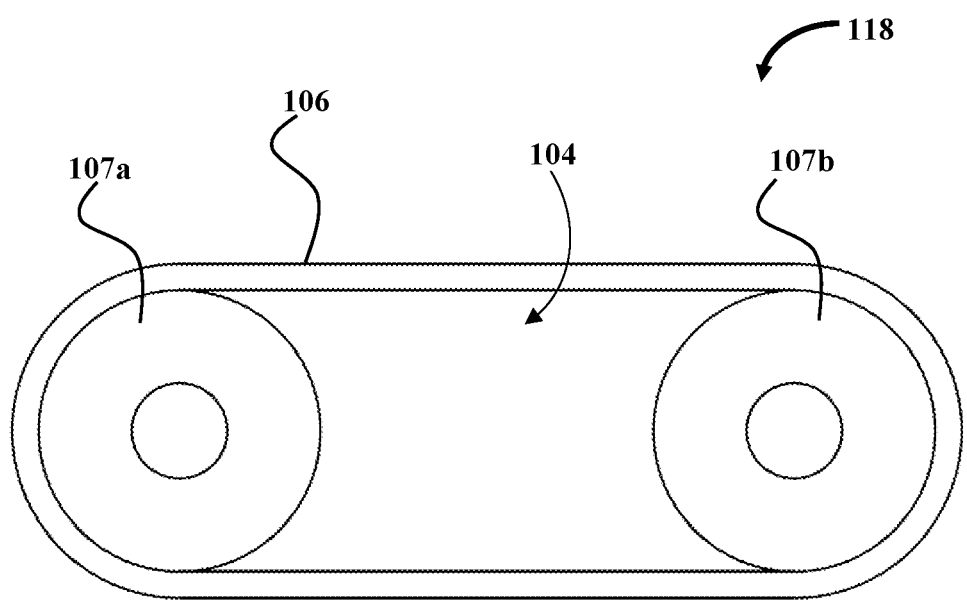
FIG. 11 illustrates a top perspective view of another embodiment of the tactile display apparatus positioned on a belt and pulley mechanism.

FIG. 11 illustrates a top perspective view of another embodiment of the tactile display apparatus 100 positioned on a belt and pulley mechanism 118. This is a simplified illustration or a schematic view of yet another apparatus in accord with this tactile display apparatus 100, where the braille cells 101 are installed on a belt-pulley mechanism 118. This embodiment of the tactile display apparatus 100 is similar to the embodiment described in FIG. 2, where the path of motion of the braille cells 101 is along a belt drive 104. A belt 106 is driven across two pulleys 107*a* and 107*b* positioned at a distance from each other. Here, one or both the pulleys 107*a* and 107*b* are driven by electric motors 108, for example, in clockwise or counter-clockwise direction, to drive the belt 106 across the two pulleys 107*a* and 107*b* to allow the motion of the braille cells 101.

Figure 12:
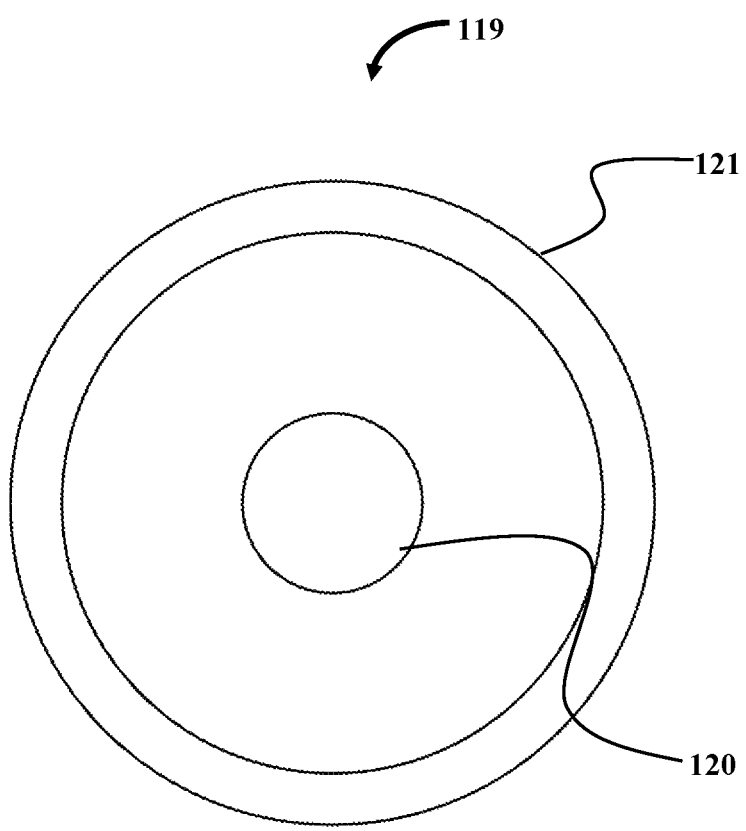
FIG. 12 illustrates a top perspective view of another embodiment of the tactile display apparatus positioned on a drum.

FIG. 12 illustrates a top perspective view of another embodiment of the tactile display apparatus 100 positioned on a drum 119. The drum shown here in FIG. 12 is almost similar to the embodiment described in FIG. 10, but instead of a circular disc 117, the drum 119 has a substantially larger thickness in comparison to the circular disc 117. Here, a hub section 120 of the drum 119 is rotated by the electric motor 108, and the braille cells 101 are positioned on a circumferential section 121 of the drum 119, where the user can sense the braille cells 101 with his/her fingers.

In one embodiment, the total number of the actuators is equal to the number of rows in a braille character. In another embodiment, the total number of the actuators is equal to two times the number of rows in a braille character. In one embodiment, the driving assembly is a belt drive. In a related embodiment, the predefined path is along the belt drive, wherein a belt is driven around at least two pulleys disposed at a distance from each other, and one of the pulleys is driven by an electric motor to drive the belt across the two pulleys. In a related embodiment, the braille cells are attached to the belt, and the movement of the belt driven by the pulleys allows the pins to be in continuous contact with the cutaneous senses of the user's fingers.

In one embodiment, the method further comprises using a body comprising a plurality of bumps, wherein each bump is configured to induce movement of each pin holder along the defined path. In one embodiment, the movement of each pin holder causes the elastic rings of each pin holder to be compressed to fix the pins in their status-quo. In one embodiment, one of the bumps is configured to push each holder in an opposite direction, wherein the elastic rings regain initial decompression status and the pins can have linear motion along their central axis. In one embodiment, the movement of each pin holder through the slot is one or combination of a linear motion, a sliding motion, and a rotary motion.

The foregoing examples have been provided merely for the purpose of explanation and are in no way to be construed as limiting of the present concept disclosed herein. While the concept has been described with reference to various embodiments, it is understood that the words, which have been used herein, are words of description and illustration, rather than words of limitation. Further, although the concept has been described herein with reference to particular means, materials, and embodiments, the concept is not intended to be limited to the particulars disclosed herein; rather, the concept extends to all functionally equivalent structures, methods and uses, such as are within the scope of the appended claims. Those skilled in the art, having the benefit of the teachings of this specification, may affect numerous modifications thereto and changes may be made without departing from the scope and spirit of the concept in its aspects.

The invention claimed is:

1. A tactile display apparatus configured to render information to a user, the tactile display apparatus comprising;
   a plurality of braille cells attached adjacent to each other along a predefined path, wherein the braille cells are configured to be moved periodically at a predefined speed via a driving assembly,
   wherein each braille cell includes a set of first slots and a set of second slots, wherein each first slot is a through-hole in the braille cell, wherein the first slots are arrayed parallel to each other and in a plurality of rows, and wherein each second slot is a through-hole in the braille cell perpendicular to said first slots;
   a set of pins housed within the first slots positioned on an upper surface of each of the braille cells, the pins configured to be selectively actuated by one or more actuators in contact with each of the pins, wherein the motion of the braille cells allow the user to contact the pins via cutaneous senses of the user's fingers to read the information represented by the arrangement of the pins; and
   a set of pin holders inserted along within the set of second slots positioned on the braille cells, wherein the pin holders are moved along a defined path to contact the pins, each pin holder comprising;
   a rigid body, wherein the rigid body is a rod; and
   a plurality of elastic rings attached separately along the length of the rigid body,
   wherein the number of elastic rings is equal to a predefined number of the pins wherein the predefined number is the number of said rows,
   wherein pins are contacted and held with the a corresponding elastic rings,
   wherein the pin holders are engaged by moving the pin holder into contact with the pins such that each pin is held by a corresponding elastic ring of the plurality of elastic rings prior to the pins leaving a surface of each actuator,
   wherein an axial movement of each pin is prevented to allow each pin to move underneath the user's finger, wherein the touched pins continuously leave a reading area of the braille cells, and
   wherein the pins are disengaged released via moving the assigned pin holders in a reverse direction until the elastic rings of the pin holders are decompressed no longer contact the pins.

2. The tactile display apparatus of claim 1, wherein the driving assembly is a belt drive.

3. The tactile display apparatus of claim 2, wherein the predefined path is along the belt drive, wherein a belt is driven around at least two pulleys disposed at a distance from each other, and one of the pulleys is driven by an electric motor to drive the belt across the two pulleys.

4. The tactile display apparatus of claim 2, wherein the braille cells are attached to the belt, and the movement of the belt driven by the pulleys allow the pins to be in continuous contact with the cutaneous senses of the user's fingers.

5. The tactile display apparatus of claim 1, further comprising a body comprising a plurality of bumps, wherein each bump is configured to induce movement of each pin holder along a defined path.

6. The tactile display apparatus of claim 5, wherein the movement of each pin holder causes the elastic rings of each pin holder to be compressed to fix the pins in their status-quo.

7. The tactile display apparatus of claim 5, wherein one of the bumps is configured to push each pin holder in an opposite direction, wherein the elastic rings regain initial decompression status and the pins are configured for linear motion along their central axis.

8. The tactile display apparatus of claim 7, wherein the movement of each pin holder through the second slot is one or combination of a linear motion, a sliding motion, and a rotary motion.

9. The tactile display apparatus of claim 1, wherein the braille cells are mounted on a circular disc, wherein the pins are positioned in each braille cell in a radially disposed orientation across the circular disc.

10. A method for selectively adjusting pins on a tactile display apparatus, the method comprising:
    providing the tactile display apparatus comprising;
    a plurality of braille cells attached adjacent to each other along a predefined path, wherein the braille cells are configured to be moved periodically at a predefined speed via a driving assembly,
    wherein each braille cell includes a set of first slots and a set of second slots, wherein each first slot is a through-hole in the braille cell, wherein the first slots are arrayed parallel to each other and in a plurality of rows, and wherein each second slot is a through-hole in the braille cell perpendicular to said first slots;
    a set of pins housed within the first slots positioned on an upper surface of each of the braille cells, the pins configured to be selectively actuated by one or more actuators in contact with each of the pins, wherein the motion of the braille cells allow the user to contact the pins via cutaneous senses of the user's fingers to read the information represented by the arrangement of the pins; and
    a set of pin holders inserted along within the set of second slots positioned on the braille cells, wherein the pin holders are configured to be moved along a defined path to contact the pins, each pin holder comprising;
    a rigid body, wherein the rigid body is a rod; and
    a plurality of elastic rings attached separately along the length of the rigid body, wherein the number of elastic rings is equal to a predefined number of the pins wherein the predefined number is the number of said rows;
    positioning the pins and the pin holders in the braille cells through their respective slots, wherein the total number of the actuators is proportional to the number of rows in a braille character;
    providing a flat member comprising a sloping surface;
    moving the braille cells in a predefined direction, wherein the set of pins of the braille cells are moved upward via the sloping surface;

deciding via a micro controller whether a pin is to be raised or not to be raised;

selectively allowing the actuator to sustain the pin in the raised position, wherein the actuator moves upward and prevents the pin from dropping, or remains stationary to allow the pin to drop down via gravity;

engaging the pin holders by moving the pin holders such that each elastic ring on each pin holder contacts and holds a pin in each row contacting and holding the pin with the elastic ring prior to the pin leaving the surface of the actuator;

wherein the pin holders prevent preventing an axial movement of the pin and allowing the pins to move underneath the user's finger, wherein the touched pins continuously leave a reading area of the braille cells; and releasing the pins via disengaging moving the assigned pin holders in a reverse direction until the elastic rings of the pin holders are decompressed no longer contact the pins.

11. The method of claim 10, wherein the total number of the actuators is equal to the number of rows in a braille character.

12. The method of claim 10, wherein the total number of the actuators is equal to two times the number of rows in a braille character.

13. The method of claim 10, wherein the driving assembly is a belt drive.

14. The method of claim 13, wherein the predefined path is along the belt drive, wherein a belt is driven around at least two pulleys disposed at a distance from each other, and one of the pulleys is driven by an electric motor to drive the belt across the two pulleys.

15. The method of claim 14, wherein the braille cells are attached to the belt, and the movement of the belt driven by the pulleys allows the pins to be in continuous contact with the cutaneous senses of the user's fingers.

16. The method of claim 10, further comprising a body comprising a plurality of bumps, wherein each bump is configured to induce movement of each pin holder along the defined path.

17. The method of claim 16, wherein the movement of each pin holder causes the elastic rings of each pin holder to be compressed to fix the pins in their status-quo.

18. The method of claim 16, wherein one of the bumps is configured to push each holder in an opposite direction, wherein the elastic rings regain initial decompression status and the pins can have linear motion along their central axis.

19. The method of claim 16, wherein the movement of each pin holder through the slot is one or combination of a linear motion, a sliding motion, and a rotary motion.

* * * * *